United States Patent Office 3,249,053
Patented May 3, 1966

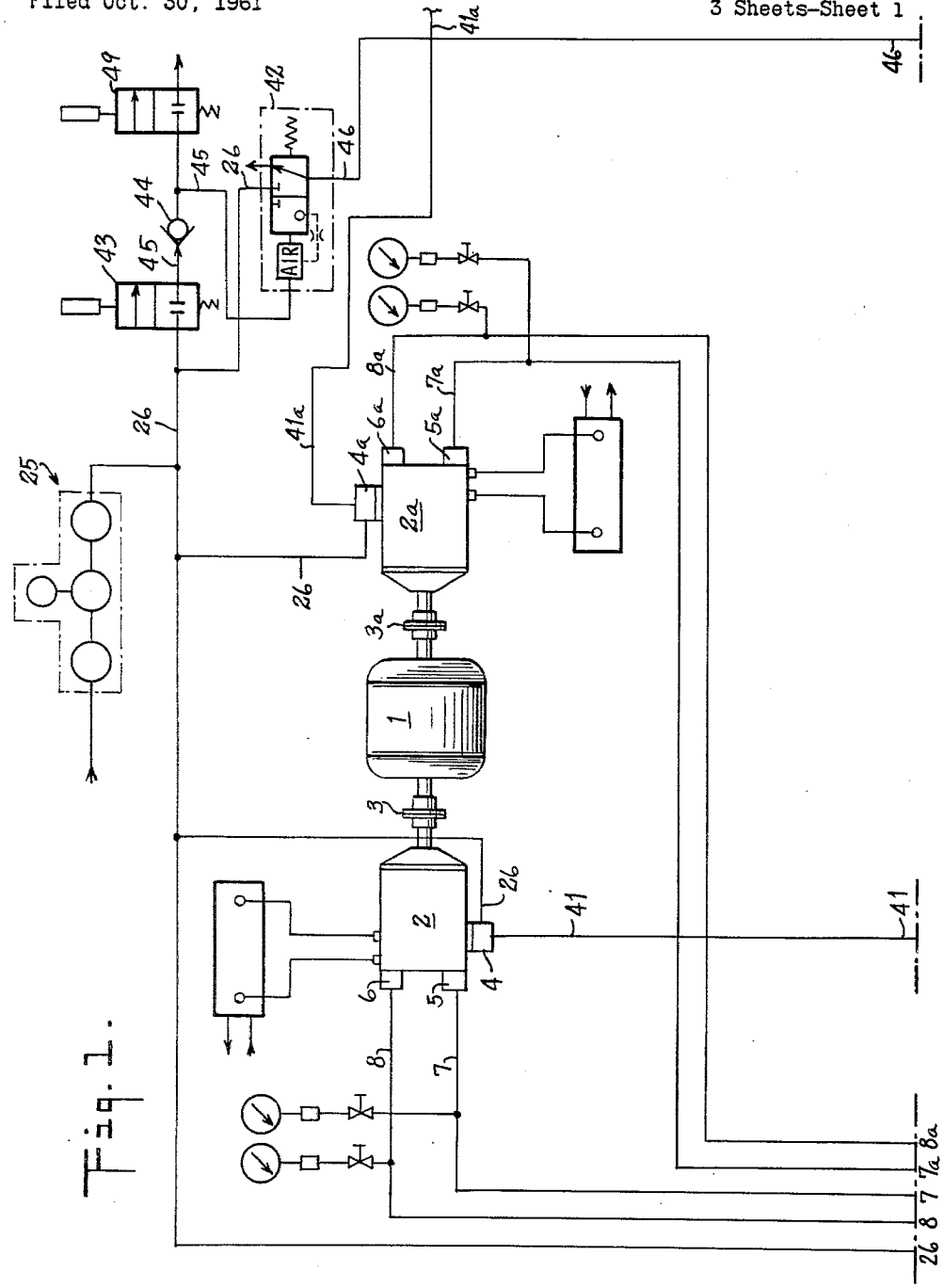

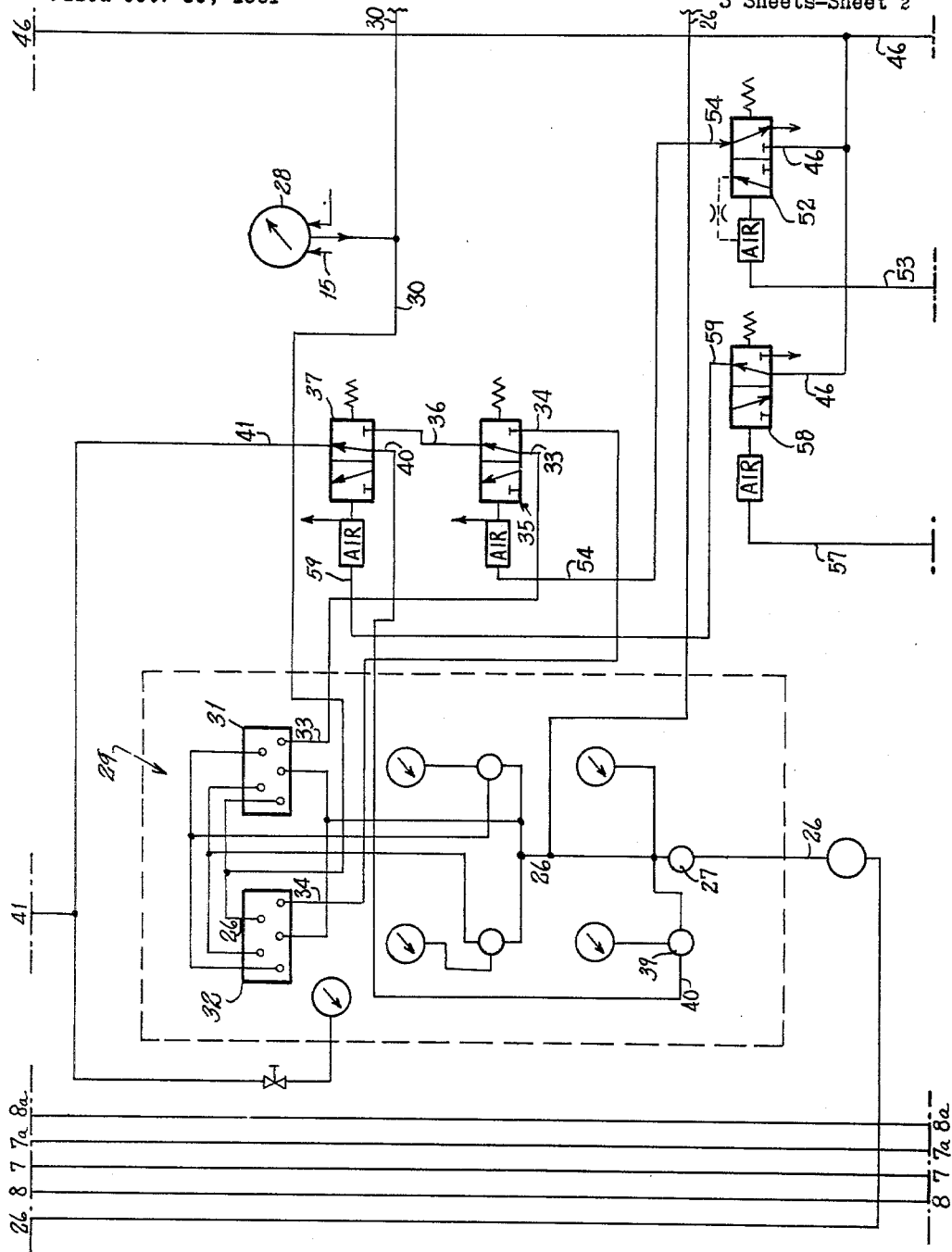

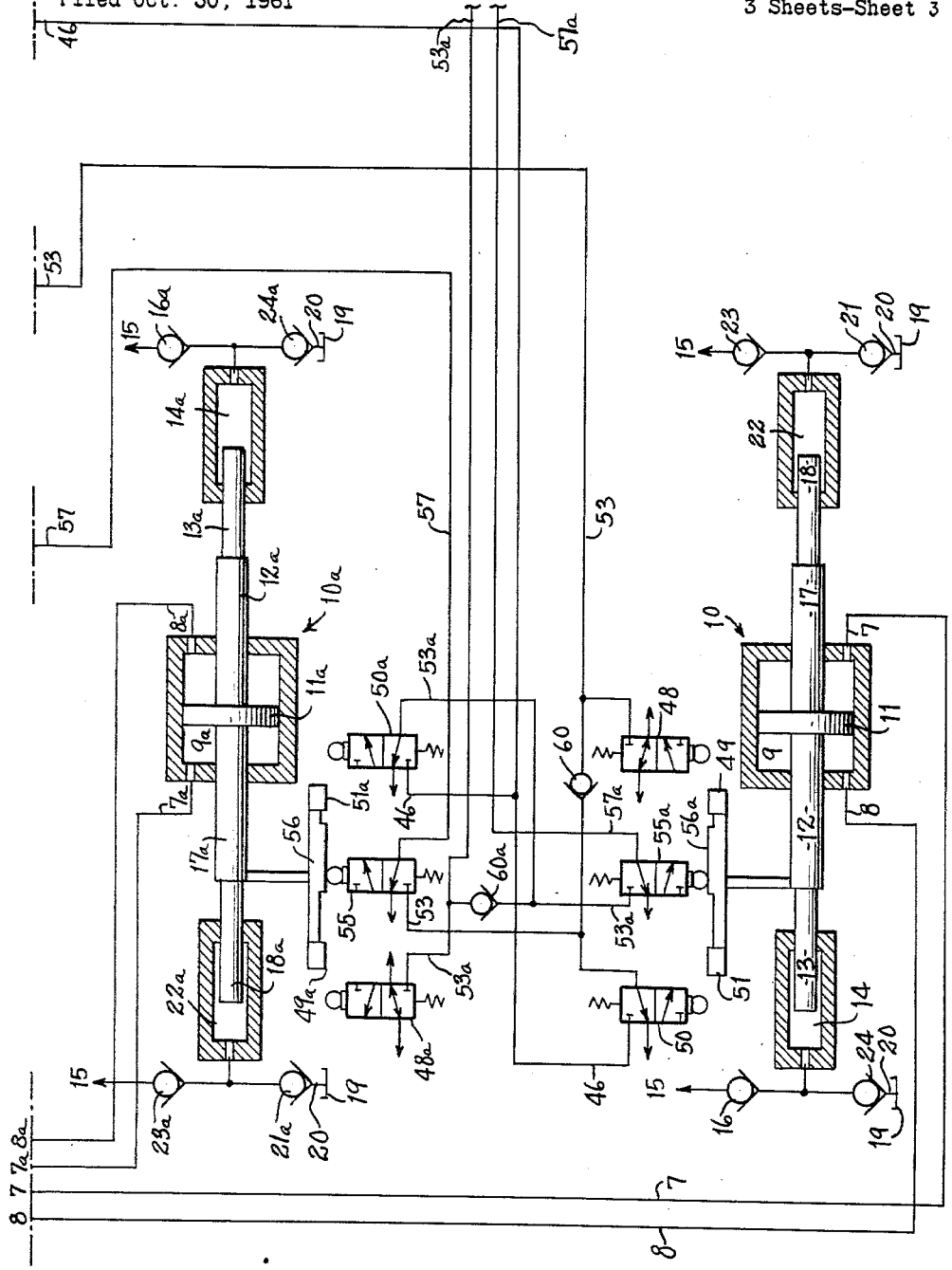

3,249,053
CONTROL SYSTEM FOR HYDRAULIC PUMPS
AND INTENSIFIERS
William L. Govan, Brighton, N.Y., assignor to Farrel
Corporation, Rochester, N.Y., a corporation of
Connecticut
Filed Oct. 30, 1961, Ser. No. 148,457
16 Claims. (Cl. 103—11)

This invention relates to control systems for reversible variable discharge pumps and is particularly useful to regulate the output of intensifiers which are powered by such pumps.

The invention makes possible the precise and uniform regulation of the delivery from both ports alternately of a reversible variable delivery pump in response to the output of a single controller, and makes possible the synchronization of several intensifiers to provide a supply of fluid under high pressure relatively free of pulsation which also can be regulated by a single controller.

Moreover, the invention provides a means of achieving such control by pneumatic circuit which is safe to use even when highly inflammable substances, such as ethylene, are to be delivered at high pressure. It is designed so that, if the pilot or control pressure should be lost, the pumps will immediately idle, and the intensifier delivered will stop.

Other novel features and advantages of this invention will be apparent to those men skilled in this art from the following description and accompanying drawings. For example, as the control advantages of a reversible variable discharge pump are realized with the intensifiers, this fluid pumping system can be used for (corrosive) liquids which can not be handled directly by such a pump, but whose flow must be regulated by a proportional controller.

FIGURE 1 is a schematic drawing of an air supply, two reversible variable discharge pumps and a portion of the air supply and control circuitry for one embodiment of this invention;

FIGURE 2 is a schematic drawing of a controller and a further portion of the control circuitry; and FIGURE 3 is a schematic drawing of two intensifier units and another portion of the control circuitry.

In brief summary, the high pressure hydraulic pumping system which is illustrated includes two proportioning intensifiers; each with two single acting high pressure output cylinders connected in tandem to one double acting input cylinder. The output cylinders are all connected to draw from a common reservoir and supply a common output. Each input cylinder is driven by a variable discharge pump, and each is reversed as its associated pump reverses. The pumps are equipped with conventional air operated linear follow-up controls.

A standard pneumatic controller is connected to measure the variable which is to regulate the high pressure output of the intensifiers. This variable may be one which is dependent on the intensifier output. In the embodiment of the invention which is described below, this variable is the operating pressure of the intensifier output cylinders.

The output of this single controller is connected to pneumatic computing relay units, one for each pump and intensifier unit to be controlled. The computing relay unit for each pump is made by simply connecting the inputs of two standard computing relays. The output of one relay is set to vary proportionally with the common input signal which is supplied by the controller while the output of the other relay varies in inverse proportion to the common input. The range through which the relay outputs vary is adjusted so that when the controller calls for no intensifier output, or, in other words, when the controller signal is at one extreme of its range, both relays in each of the relay units will have the output signal which, when connected to the pump's air operated stroke control would cause it to idle. When the controller output shifts toward the other extreme of its range, to call for delivery from the intensifiers, one relay output in each unit decreases so that, if connected to the pump control, it would call for delivery from one pump delivery port, while the other relay output increases to call for delivery from the other port.

A selector valve is connected between the relay outputs of each unit and by determining which is fed to the pump control determines the port through which the pump delivers in response to the controller signal and thus the direction in which the double acting intensifier moves, also in response to the controller signal. As the controller is connected to two computing relay units, the output of both intensifiers is simultaneously and uniformly controlled. An interlocking control system, which is described below, maintains intensifiers of similar speed or cycle time in a predetermined phase relationship to each other which minimizes pulsation in the common high pressure delivery line which is fed by all four high pressure output cylinders.

The preferred mode presently contemplated for carrying out the invention is set forth below. For convenience in reference, the parts of the second relay, pump and intensifier unit which correspond to those of the first are generally given the same number followed by an "a."

An engine or motor 1 drives pumps 2 and 2a through flexible couplings 3 and 3a.

Pumps 2 and 2a are the reversible variable delivery pumps which are well known in other application. They incorporate, as pump control means 4 and 4a, standard air operated linear follow-up stroke controls which vary the pump's displacement according to variation in the signal air pressure. Thus, when the pump is driven at a relatively constant speed, pump delivery ranges from a maximum at delivery port 5, when the signal pressure is at the high point of its range, to a maximum at delivery port 6, when the signal pressure is at the low point of its range. When the signal pressure is approximately midway between these high and low points, the pump idles, that is, it has no displacement and hence no delivery from either port.

Output ports 5 and 6 of pump 2 are connected through piping 7 and 8, respectively, to opposite ends of a double acting input cylinder 9 of intensifier 10. Pump delivery through port 5 and piping 7, and the return circulation of hydraulic fluid through piping 8 and port 6, drives piston 11, piston rod 12 and piston or plunger 13 to the left to cause a discharge of ethylene or other fluid from high pressure hydraulic cylinder 14 into output or delivery line 15 past check valve 16. At the same time, piston rod 17 and piston or plunger 18 moves to the left to draw from reservoir 19, which may or may not be under pressure, through piping 20 and past check valve 21 to fill the output cylinder 22.

Similarly, pump delivery from port 6 and through piping 8 drives piston 11 to the right causing plunger 18 to deliver fluid past check valve 23 to the same output line 15, and causing cylinder 14 to fill from line 20 past check valve 24.

The output ports 5a and 6a of pump 2a are similarly connected to intensifier 10a which operates in the same manner to draw fluid from reservoir 19 and deliver it under high pressure to delivery line 15.

The hydraulic system is, of course, equipped with the conventional valves, meters, filters, etc. which are not described as they are well known to those familiar with this art. Likewise, while in this embodiment each intensifier consists of two single-acting high pressure output cylinders connected in tandem to one double-acting double rod input hydraulic cylinder, it is possible to substitute a separate input cylinder for each output cylinder and to provide an alternative means of powering the intake stroke of the high pressure output cylinders. This may be done, for example, by a spring or by maintaining the fluid in reservoir 19 under pressure.

The pneumatic control system is supplied from any convenient source 25 with filtered, pressure regulated and lubricant carrying air. This supply is carried by tubing 26 directly to the pump controls 4 and 4a and, through start-stop controls, to the directional and interlock control system, which will be subsequently described. The supply air is delivered through pressure reducing regulator 27 and extensions of line 26 to the computing relay units, also described below.

A pneumatic controller 28 is connected to measure a variable according to which the intensifier output is to be regulated. In this case, the controller 28 is connected to measure the pressure in delivery line 15 and, to regulate this pressure within limits dependent generally on the sensitivity of the controller and the capacity of the intensifier system as compared with the supply demands placed upon it. The output of the controller, which may be supplied with air from any convenient source, is transmitted to computing relay units 29 (and 29a, not shown) through tubing 30.

Each computing relay unit includes two conventional computing relays 31 and 32, with their inputs connected together. The signal pressure output of relay 31 varies proportionally with the common input, that is, with the controller output. The signal pressure of relay 32 varies in inverse proportion with the common input.

The ranges of signal pressure from the two relays in each relay unit are adjusted back to back so that the minimum signal pressure of relay 31 is equal to the maximum signal pressure of relay 32. This pressure is also set equal to the idling pressure of the pump control. It is produced by the relays when the controller output is at one extreme of its range so as to call for no intensifier output, and the range of relay signal pressure is adjusted so that each will cause the pump delivery to vary from idling (or no delivery) to full delivery at one of the two pump discharge ports when the controller output is at the other extreme of its range to call for maximum output from the intensifier.

The output signal pressures from relays 31 and 32 are connected by tubes 33 and 34, respectively, to valve 35, which is a conventional two way seated type selector air valve, pneumatically operated and vented so that the pilot operating pressure cannot leak into the controlled signal air pressure. This valve, hereinafter referred to as the direction selector, transmits the signal pressure from tube 33 to tube 36 in its returned or left hand position, that is, the right hand flow pattern block of the valve symbol, and connects the signal pressure from tube 34 to tube 36 in its actuated or right hand position. As will be seen from the following description, the right hand position of this direction selector corresponds to the rightward movement of the associated intensifier and the left hand position of the selector valve corresponds to the leftward movement of the intensifier.

Tubing 36 connects with a valve 37 which is constructed like valve 35 and hereinafter referred to as the interlock selector. A reducing regulator 39 supplies air from supply line 26 to valve 37 through tubing 40 at the idling pressure of the pump control. In its returned or left hand position, the interlock selector connects tube 40 to tube 41 to supply idling pressure to the air operated stroke control 4 thereby causing the pump to idle. When actuated and in its right hand operating position, the interlock selector connects tube 36 to tube 41 to transmit the signal pressure from the direction selector to the pump control.

The control circuit so far described operates, with the interlock selector actuated, to make pump (and thereby intensifier) delivery proportional to the controller output. The position of the direction selector determines the pump port from which this delivery is made, which in turn determines the intensifier output cylinder 14 or 22 from which the high pressure delivery is made. The signal pressure output from relay unit 29a (not shown) similarly controls intensifier 10a.

The direction selector valve 35 is operated by means which cause the intensifier to make a full stroke to the left and to then reverse and make a full stroke to the right, while the output from the high pressure cylinders is maintained proportional to the controller output, except for the moment of reversal.

Pilot pressure for these direction (and interlock) control systems is supplied from tubing 26 to tubing 46 through air operated holding relay valve 42. In its returned or left hand position, the valve is closed. Depressing a push botton start valve 43 actuates the holding valve 42 through check valve 44 and tubing 45. The valve 42 holds closed, and pilot pressure is thereby maintained in line 46, until the push stop valve 47 is depressed which exhausts the actuating cylinder of valve 42 through piping 45.

The directional control system includes a limit valve 48 positioned to be actuated by a cam 49 on the connecting rod 12 when the intensifier 10 completes a stroke to the right, and limit valve 50 positioned to be actuated by cam 51 when the leftward stroke is completed.

Limit valves 48 and 50 control a holding valve 52, which in turn controls the direction selector valve 35 in the following manner. When intensifier 10 has completed its leftward stroke, normally closed valve 50 is actuated, shifts to its up position and transmits the pilot pressure from line 46 to line 53 which actuates valve 52. Valve 52 shifts and holds right to transmit pilot pressure from line 46 to line 54, which actuates valve 35. Valve 35 shifts to the right connecting tube 34 and thereby the signal output of relay 32 to tube 36. Assuming the interlock selector is actuated, the intensifier shifts to the right as described above. Check valve 60 keeps valve 50 from exhausting line 53 when it is released by the rightward moving cam 51.

When intensifier 10 has completed its rightward stroke, normally closed limit valve 48 is actuated, shifts to its up position and exhausts line 53. This allows holding valve 52 to return, which exhausts line 54 and allows direction selector valve 35 to return connecting lines 33 and 36 to transmit the signal pressure output of relay 31. As line 53 is exhausted at the start up, the leftward movement is the initial one for intensifier 10 and as line 53a is also exhausted at the start up, intensifier 10a commences with the rightward movement.

The direction control system of intensifier 10a is the same, and therefore only the limit valves 48a and 50a are shown.

The interlock selector is operated by means which rephase intensifiers 10 and 10a every cycle to maintain them in the phase relation best suited to their application. The even and steady delivery of ethylene from the four high pressure output cylinders is achieved through this system by operating intensifier 10a one quarter cycle ahead of intensifier 10.

The interlock control system for intensifier 10 includes valve 55 which is positioned to be operated by cam 56 on connecting rod 17a while intensifier 10a is moving through its left end half cycle and when thus actuated, valve 55 connects line 53 to line 57 and the actuating cylinder of a three way normally open valve 58. Before this valve is actuated, it is in its lefthand position and pilot pressure is transmitted from line 46 to line 59 to actuate the interlock selector valve 37. When valve 58 is actuated, it shifts right to exhaust line 59 and causes interlock selector 37 to transmit idling pressure from line 40 to the pump control. It can be seen, therefore, that if limit valve 50 is actuated while intensifier 10a is in its left half cycle, intensifier 10 will idle at its extreme lefthand position until intensifier 10a leads it by one quarter cycle (or ½ stroke) when it passes its mid stroke position and releases valve 55.

In a similar manner, interlock valve 55a is positioned to be operated by cam 56a on intensifier 10 from the last half of its leftward stroke to the mid point of its rightward stroke. Should intensifier 10a complete its rightward stroke during this half cycle, it will be caused to idle until it leads intensifier 10 by one-quarter cycle, as idling signal pressure is supplied from line 40a (not shown) through interlock selector valve 37a (not shown) to pump control 4a (not shown). If the intensifiers are similar in construction or otherwise caused to move at approximately the same speed, this system will synchronize their movement from *any* initial position, and thereafter maintain them in the desired phase relation.

The control circuit described for either intensifier will automatically fail safe and idle the intensifier when pilot pressure is lost, so long as idling pressure is maintained in line 40 (which requires supply pressure in line 26).

Certain equivalent constructions will be apparent to men skilled in this art in view of the above disclosure. For example, the relative positions of cams 56 and 56a can be reversed if the order of one set of valves 48, 55 and 50 is also reversed. Direct cam operated valves can be replaced by limit switches controlling solenoid valves. Pilot hydraulic valves can be used with oil or other fluid instead of pneumatic valves. Pneumatic linear proportional pump control can be replaced by its electrical equivalent.

I claim:

1. A fluid pumping system including an intensifier of two output fluid cylinders connected to two input fluid cylinders, a reversible variable displacement pump, means connecting one pump delivery port to one of said input fluid cylinders and the other pump delivery port to the other of said input fluid cylinders, means connecting the output ports of said output fluid cylinders, pump control means for reversing and varying the output of said pump, a single controller, means connecting the output of said controller to said pump control means so that the output of each said output fluid cylinders varies in turn proportionally with the single controller's output.

2. A fluid pumping system including an intensifier of two single-acting output fluid cylinders connected in tandem to two input fluid cylinders constructed as one double acting cylinder, a reversible variable displacement pump, means connecting one pump delivery port to one of said input fluid cylinders and the other pump delivery port to the other of said input fluid cylinders, means connecting the output ports of said output fluid cylinders, pneumatic pump control means for reversing and varying the output of said pump, a single pneumatic controller, means connecting the output of said controller to said pump control means including a pneumatic computing relay unit, a direction selector valve, and means for operating said direction selector valve so that the output of each said output fluid cylinders varies in turn proportionally with the single controller's output.

3. A fluid pumping system including an intensifier of two single-acting output fluid cylinders connected in tandem to two input fluid cylinders constructed as one double acting cylinder, a reversible variable displacement pump, means connecting one pump delivery port to one of said input fluid cylinders and the other pump delivery port to the other of said input fluid cylinders, means connecting the output ports of said fluid cylinders, pump control means for reversing and varying the output of said pump, a single controller, means connecting the input of said controller to a varible dependent on the delivery of said output cylinders, means connecting the output of said controller to said pump control means including a computing relay unit, a direction selector and means for operating said direction selector so that the output of each said output fluid cylinders varies in turn proportionally with the single controller's output.

4. A fluid pumping system including an intensifier of two single-acting output fluid cylinders connected to two input fluid cylinders, a reversible variable displacement pump, means connecting one pump delivery port to one of said input fluid cylinders and the other pump delivery port to the other of said input fluid cylinders, means connecting the output ports of said output fluid cylinders, pump control means for reversing and varying the output of said pump, a single controller, means connecting the output of said controller to said pump control means including a computing relay unit having a first signal which varies proportionally with the relay input and a second signal which varies inversely proportionally with the relay input, and with the range of said second relay signal back to back with the range of said first relay signal, a direction selector connecting said first relay signal with said pump control means in one position and connecting said second relay signal to said pump means in another position, and means for operating said direction selector so that said first relay signal regulates the output from one pump delivery port to one of said input fluid cylinders and thereby the output of one of said output fluid cylinders and said second relay signal regulates the output from the other pump delivery port to the other of said input fluid cylinders and thereby the output of the other output fluid cylinder so that the output of each said output fluid cylinders varies in turn proportionally with the single controller's output.

5. The combination of a first and a second fluid pumping system, each as described in claim 4, means connecting the outputs of all of said output fluid cylinders and an interlock control system for at least one of said intensifiers including an idling signal pressure, an interlock selector valve connected to transmit the output from said directional selector to said pump control means in a first position and to transmit said idling signal pressure to said pump control means in a second position and means causing the interlock selector to move to said idle position when a piston of an output fluid cylinder of the associated intensifier unit substantially completes its delivery stroke and to remain in said idle position until the other intensifier unit reaches a preselected position in its operating cycle thereby causing the intensifier units to be rephased at least once each cycle.

6. A fluid pumping system including an intensifier of two single-acting output fluid cylinders connected in tandem to two input fluid cylinders constructed as one double acting cylinder, a reversible variable displacement pump, means connecting one pump delivery port to one of said input fluid cylinders and the other pump delivery port to the other of said input fluid cylinders, means connecting the output ports of said output fluid cylinders, pneumatic pump control means for reversing and varying the output of said pump, a single pneumatic controller, means connecting the input of said controller to a variable dependent on the pump delivery, means connecting the output of said controller to said pump control means including a pneumatic computing relay unit having a first signal pressure which varies proportionally with the relay input and a second signal pressure which varies inversely proportionally with the relay input, and with the range of said second relay signal pressure back to back with the range of said first relay signal pressure, a direction selector valve connecting said first relay signal pressure with said pump control means in one position and connecting said second relay signal pressure to said pump means in another position, and means for operating said direction selector valve so that said first relay signal pressure regulates the output from one pump delivery port to one of said input fluid cylinders and thereby the output of one of said output fluid cylinders and said second relay signal pressure regulates the output from the other pump delivery port to the other of said input fluid cylinders and thereby the output of the other output fluid cylinder so that the output of each said output fluid cylinders varies in turn proportionally with the single controller's output.

7. The pumping system of claim 6 in which the means for operating said direction selector valve includes limit valves which are actuated to cause the direction selector valve to change positions and the pump to reverse as each piston of the output fluid cylinders completes its output stroke.

8. The combination of a first and a second fluid pumping system, each as described in claim 7, means connecting the outputs of all of said output fluid cylinders and an interlock control system for at least one of said intensifiers including an idling signal pressure, an interlock selector valve connected to transmit the output from said directional selector to said pump control means in a first position and to transmit said idling signal pressure to said pump control means in a second position and means causing the interlock selector to move to said idle position when a piston of an output fluid cylinder of the associated intensifier unit substantially completes its delivery stroke and to remain in said idle position until the other intensifier unit reaches a preselected position in its operating cycle thereby causing the intensifier unit to be rephased at least once each cycle.

9. The combination of a first and a second fluid pumping system, each as described in claim 7, means connecting the outputs of all of said output fluid cylinders and an interlock control system for both of said intensifiers including an idling signal pressure, an interlock selector valve connected to transmit the output from said directional selector to said pump control means in a first position and to transmit said idling signal pressure to said pump control means in a second position and means causing the interlock selector for each of said intensifiers to move to said idle position when a piston of an output fluid cylinder of the associated intensifier unit substantially completes its delivery stroke and to remain in said idle position until the other intensifier unit reaches a preselected position in its operating cycle thereby causing each of the intensifier units to be rephased at least once each cycle.

10. A control system for a reversible variable displacement hydraulic pump having pump control means for reversing and varying its delivery of hydraulic fluid through output-input ports and having conduit means interconnecting the output-input ports with a reciprocating hydraulic motor so that said motor is powered according to the output of hydraulic fluid from the pump; said control system including a single controller, input signal means interconnecting the input of said controller with a variable derived from the circuit powered by the output of the hydraulic motor, means interconnecting the output of said controller with the pump control means so that the pump output is regulated and the reciprocating hydraulic motor operated according to the said variable in both directions of its reciprocation.

11. A control system for a hydraulic circuit including a reversible variable displacement hydraulic pump having pump control means for varying its output of hydraulic fluid between hydraulic fluid output-input ports from full flow in one direction through an idle condition of no flow to full flow in the other direction, a reversible hydraulic motor, and conduit means interconnecting the pump output-input ports with the motor so that the pump powers the motor; said control system including a single controller, means interconnecting the input of said controller with a variable dependent on the circuit powered by the output of said motor, a computing relay unit and means interconnecting the output signal of said controller to the input of said relay unit, said relay constructed to provide at least two outputs one of which varies proportionally with the input signal from the controller and another of which varies in inverse proportion to the input signal from the controller, direction means for connecting one or the other of said computing relay output signals to the pump control means whereby the output of the pump and thereby the operation of the reversible hydraulic motor may be controlled in turn in both directions of pumping and motor operation according to said variable and through said single controller.

12. A control system for a hydraulic circuit including a reversible variable displacement hydraulic pump having pneumatic pump control means for causing the pump output to vary from full flow in one direction through an idle condition of no flow to full flow in the other direction, said flow being between pump output-input ports, a reciprocating hydraulic motor, and conduit means interconnecting the pump output-input ports with the motor so that the pump may power the motor; said control system including a single controller, means interconnecting a variable dependent on the operation of the circuit powered by said reciprocating hydraulic motor with the input of said controller, relay unit means and means for interconnecting the output signal from said controller to the input of a relay computer for providing at least two relay output signals, one proportional to the output signal of the controller and another inversely proportional to the output signal of the controller, direction sense means for connecting one of said relay output signals to the pump control means while the reciprocating hydraulic motor is being operated in one direction and for connecting the other of said relay output signals to the pump control means when the reciprocating hydraulic motor is being operated in the other direction so that the operation of the hydraulic motor may be uniformly controlled according to said variable and through said single controller when it is being operated in one direction of reciprocation as well as when it is operated in the other direction of reciprocation.

13. A control system for a hydraulic circuit including a reversible variable displacement hydraulic pump having substantially linear pump control means for causing the output from said pump to range from full flow in one direction through an idle condition of no flow to full flow in the other direction, a reciprocating hydraulic motor and conduit means interconnecting said pump with said motor whereby said pump may power said motor; said control system including a single controller, means interconnecting the input of said controller with a variable dependent on the output of the circuit powered by said pump, a computing relay unit having a first signal output which varies proportionally with the relay input and a second signal output which varies inversely proportional with the relay input, and with the range of said second relay signal back to back with the range of said first relay signal, means interconnecting the output signal from said controller to the relay input, a direction selector means connecting said first relay signal with the pump control means in one position and connecting said second relay signal to the pump control means in another position, and means for operating said direction selector means so that said first relay signal regulates the output from the pump while said hydraulic motor is being powered toward one direction of reciprocation and so that said second relay signal regulates the output from the pump while said hydraulic motor is being powered toward another direction of reciprocation whereby the output of the pump is controlled in both directions of flow according to the variable dependent on pump output.

14. A control system for a hydraulic circuit including a reversible variable displacement hydraulic pump having substantially linear pneumatic pump control means which in response to variation in applied signal air pressure causes a variation in the output from said pump so that it ranges from full flow in one direction through an idle condition of no flow to full flow in the other direction, a reciprocating hydraulic motor and conduit interconnecting said pump with said motor whereby said pump may power said motor; said control system including a single controller, means interconnecting the input of said controller with a variable dependent on the pressure of the circuit powered by said pump, said controller being constructed to provide air output signal air pressure that varies in accordance with the input pressure, a pneumatic computing relay unit having a first signal air pressure output which varies proportionally with the relay input and a second signal air pressure output which varies inversely proportionally with the relay input, and with the range of said second relay signal air pressure back to back with the range of said first relay signal air pressure, tubing interconnecting the output signal air pressure from said controller to the relay input, a direction selector and tubing means connecting said first relay signal air pressure with the pneumatic pump control means in one position and connecting said second relay signal air pressure to the pneumatic pump control means in another position, and means for operating said direction selector means so that said first relay signal air pressure regulates the output from the pump while said hydraulic motor is being powered toward one direction of reciprocation and so that said second relay signal air pressure regulates the output from the pump while said hydraulic motor is being powered toward the other direction of reciprocation whereby the output of the pump in both directions of flow and thereby the operation of the reciprocating cylinder in both directions of reciprocation is controlled according to the variable dependent on pump output pressure and through said single controller.

15. A control system for a hydraulic circuit including a reversible variable displacement hydraulic pump having pump control means which in response to variation in input signal amplitude causes the pump output to vary from full flow in one direction through an idle condition of no flow to full flow in the other direction, said flow being between pump output-input ports, a reciprocating hydraulic motor, conduit means interconnecting the pump output-input ports with the motor so that the pump powers the motor; said control system including a single controller, means interconnecting the input of said controller with a variable dependent on the circuit powered by output of said hydraulic motor, a computing relay unit, said relay unit constructed to provide a first relay output signal which varies proportionally with the relay input signal and a second relay output signal which varies inversely proportionally with the relay input signal, means interconnecting the output from said controller to the input of said computing relay unit, direction selector means for connecting said first relay output signal to said pump control means in a first position and for connecting said second relay output signal to said pump control means in a second position, and limit sensing means for operating said direction selector from one position to the other position when the hydraulic motor completes its movement in each direction of reciprocation so that the pump is reversed to power the hydraulic motor in the other direction of reciprocation and so that the output-input of the hydraulic motor continues to be regulated according to said variable and through said single controller when direction of reciprocation is reversed.

16. A control system for a hydraulic circuit including a reversible variable displacement hydraulic pump having pneumatic pump control means which in response to variation in applied signal air pressure cause a variation in pump output flow so that the output ranges from full flow in one direction to full flow in the other direction, said flow being between pump output-input ports, a reciprocating hydraulic motor, conduit means interconnecting the output-input ports with the motor so that the pump powers the motor according to the volume and direction of the delivery of hydraulic fluid; said control system including a single pneumatic controller constructed to provide a signal air pressure output that varies in proportion to an input variable, means connecting a variable dependent on the circuit powered by the output of said pump with the input of said controller, a pneumatic computing relay unit constructed to provide a first output of signal air pressure that varies proportionally with the input signal air pressure and a second output signal air pressure varies inversely proportionally with the input signal air pressure, tubing interconnecting the output of the controller with the input of the relay unit, valving means for connecting said first relay output air pressure to the pneumatic pump control means in a first position and for connecting said second relay output signal air pressure to the pneumatic pump control means in a second position, reversing means for operating said valving means alternately from said first position to said second position and from said second position to said first position, and means for operating said reversing means so that the reciprocating hydraulic motor may be alternately powered in first one direction of reciprocation and then in the other direction of said reciprocation and so that as the direction of reciprocation is reversed the output of the pump and thereby the operation of the hydraulic motor continues to be regulated to the same amplitude according to the said variable connected through the said single controller despite the fact that the direction of hydraulic fluid flow from the pump and the direction of reciprocation of the hydraulic motor is reversed.

References Cited by the Examiner
UNITED STATES PATENTS

| | | | |
|---|---|---|---|
| 2,141,731 | 12/1938 | Wolfrom et al. | 103—49 |
| 2,248,452 | 7/1941 | Erickson | 103—161 |
| 2,625,887 | 1/1953 | Anderson | 103—162 |
| 2,660,955 | 12/1953 | Kent et al. | 103—49 |
| 2,945,449 | 7/1960 | Le Febvre | 60—52 |
| 2,977,765 | 4/1961 | Fillmore | 60—52 |
| 3,003,309 | 10/1961 | Bowers | 103—37 |
| 3,008,423 | 11/1961 | Miller | 60—52 |
| 3,017,750 | 1/1962 | Kimpson | 60—52 |
| 3,022,738 | 2/1962 | Krute | 103—49 |
| 3,078,674 | 2/1963 | Anderson | 60—52 |

LAURENCE V. EFNER, *Primary Examiner.*